United States Patent
Dobin et al.

(10) Patent No.: US 9,645,270 B2
(45) Date of Patent: May 9, 2017

(54) METHOD FOR POST-STACK NOISE MITIGATION

(71) Applicants: Mark W. Dobin, The Woodlands, TX (US); Guo-Shi Li, Houston, TX (US)

(72) Inventors: Mark W. Dobin, The Woodlands, TX (US); Guo-Shi Li, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 368 days.

(21) Appl. No.: 14/486,945

(22) Filed: Sep. 15, 2014

(65) Prior Publication Data

US 2015/0117143 A1    Apr. 30, 2015

Related U.S. Application Data (60) Provisional application No. 61/897,025, filed on Oct. 29, 2013.

(51) Int. Cl.
*G01V 1/00* (2006.01)
*G01V 1/36* (2006.01)

(52) U.S. Cl.
CPC ............... *G01V 1/36* (2013.01); *G01V 1/364* (2013.01); *G01V 2210/32* (2013.01); *G01V 2210/3246* (2013.01)

(58) Field of Classification Search
CPC .. G01V 1/36; G01V 1/364; G01V 2210/3246; G01V 2210/32
See application file for complete search history.

(56) References Cited

U.S. PATENT DOCUMENTS

| | | |
|---|---|---|
| 5,237,538 A | 8/1993 | Linville, Jr. et al. |
| 8,315,124 B2 | 11/2012 | Zhu |

OTHER PUBLICATIONS

Jeong et al., "Interactive 3D seismic fault detected on the Graphics Hardware", Volume Graphics (2006).*
Fomel, S. (2002), "Applications of plane-wave destruction filters," *Geophysics* 67(6), pp. 1946-1960.
Liu, Y. et al. (2010), "Nonlinear structure-enhancing filtering using plane-wave prediction," *Geophysical Prospecting* 58, pp. 415-427.
Hale, D. (2009), "Structure-oriented smoothing and semblance," Center for wave Phenomena, Report CWP-635, XP055153665, pp. 1-10.
Jeong, W-K et al. (2006), "Interactive 3D seismic fault detection on the Graphics Hardware," *Volume Graphics*, pp. 1-8.
International Search Report and Written Opinion, dated Dec. 4, 2014, PCT/US2014/055691.

(Continued)

*Primary Examiner* — Krystine Breier
(74) *Attorney, Agent, or Firm* — ExxonMobil Upstream Research-Law Department (57) ABSTRACT

Method for mitigating coherent noise and seismic data using an adaptively varying filter. The strongest and most coherent pattern (53), generally associated with the geology, is adaptively removed (56) from the original seismic data, producing an intermediate product that consists predominantly of noise. These noise data are then removed from the original input data (57) to produce a significantly more interpretable seismic volume.

8 Claims, 5 Drawing Sheets

(56) References Cited

OTHER PUBLICATIONS

Bigun, J. et al. (1986), "Optimal Orientation of Linear Symmetry," Tecn. Report LiTH-ISY-I-0820, Computer Vision Laboratory, Linkoping University, Sweden, Thesis Report, Linkoping studies in science and technology No. 85, 17 pgs.

Bigun, J. et al. (1987), "Optimal Orientation Detection of Linear Symmetry," First Int. Conf. on Computer Vision, ICCV (London), IEE Computer Society Press, pp. 433-438.

Knutsson, "Representing local structure using tensors," Proceedings $6^{th}$ Scandinavian Conf. on Image Analysis, Oulu University, pp. 244-251.

Yilmaz, O. (1987). "Seismic Data Processing," Society of Exploration Geophysicists, pp. 1-23.

\* cited by examiner

Original data containing coherent and random noise

FIG. 6A

Results after applying present inventive method

FIG. 6B

Image of removed data

METHOD FOR POST-STACK NOISE MITIGATION

CROSS-REFERENCE TO RELATED APPLICATION

This application claims the benefit of U.S. Provisional Patent Application 61/897,025, filed Oct. 29, 2013, entitled METHOD FOR POST-STACK NOISE MITIGATION, the entirety of which is incorporated by reference herein.

FIELD OF THE INVENTION

This disclosure relates generally to the field of geophysical prospecting for hydrocarbons and, more particularly, to seismic data processing. Specifically, the disclosure relates to a method for mitigating noise, primarily coherent noise, from seismic data using an adaptively varying filter.

BACKGROUND OF THE INVENTION

Interpretation of the subsurface geology from seismic data is made more difficult and time consuming due to constructive and destructive noise impacting the seismic data quality. The presence of strong noise makes automated interpretation techniques unusable and manual interpretation more challenging. As a result, the time required to complete interpretation is increased, the risk of deducing an incorrect interpretation of subsurface geology is elevated, and the potential of missed business opportunities can be increased.

There is at least one commercially available coherent noise removal method. The vendor is ffA Geoscience. The ffA method targets the removal of the noise and involves the following steps: (1) the input data is smoothed, (2) the structural dip is estimated from the smoothed data, and (3) a 3D structurally-steered diffusion filter is applied to the original (unsmoothed) data to mitigate the noise.

SUMMARY OF THE INVENTION

The invention, which may be called ACon (adaptive coherent noise removal), has two basic steps. First, the strongest and most coherent pattern (generally associated with the geology) is adaptively removed from the original seismic data, producing an intermediate product that consists predominantly of noise. These noise data are then removed from the original input data to produce a significantly more interpretable seismic volume. The final filtered product will enable more efficient application of automated tools, reduction in interpretation cycle time, and improve the overall quality and promotes the likelihood of extracting more insights and a more accurate understanding of the subsurface geology.

In one embodiment, the invention is a method for mitigating coherent noise in seismic data, comprising: (a) obtaining seismic data; (b) identifying from the seismic data a dominant direction representing orientation of subsurface strata; (c) adaptively subtracting data corresponding to the dominant direction from the seismic data; (d) subtracting average seismic amplitude from data resulting from (c), to generate an estimate of noise; and (e) subtracting the estimated noise from the obtained seismic data.

BRIEF DESCRIPTION OF THE DRAWINGS

The present invention will be better understood by referring to the following detailed description and the attached drawings in which.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. As with all seismic data processing methods, in all practical applications of the present inventive method, some or all of the steps are performed using a computer programmed in accordance with the disclosure herein.

DETAILED DESCRIPTION OF EXAMPLE EMBODIMENTS

Figure 1:
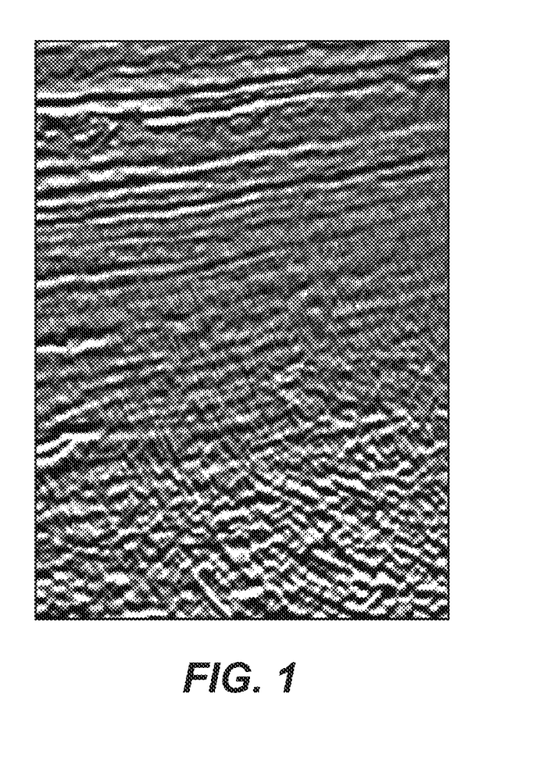
FIG. 1 shows an example of coherent noise in a seismic image, where the noise has a dominant noise direction.

The term "coherent noise" in a seismic image means semi-regular noise patterns appearing, for example, on 2D slices of seismic data. There are numerous possible causes of coherent noise, such as acquisition noises, artifacts in the seismic process, etc. No matter what the cause is, by the time the seismic volume gets into the geoscientist's hands, the noise is already intertwined with the true data, making interpretation and analysis more difficult. However, since the coherent noises are artifacts instead of representing true geology, they usually exhibit semi-regular patterns, hence can be clearly distinguished from underlying geologic features. FIG. 1) shows an example of such a seismic image, where the coherent noise can be seen as nearly vertical stripes, which stripes define a coherent noise direction.

There are numerous post processing methods that are commercially available for improving the quality of seismic data for interpretation. These tools generally fall into two classes depending upon whether the noise that is removed is random or coherent. Most of the available methods are for random noise. For coherent noise mitigation, the number of tools is significantly fewer. In the development of the present invention, an earlier stage product, which may be referred to as Conor (Coherent noise removal), uses a specially designed 2D convolution operator. The user specifies the direction of coherent noise, which is then used to calculate the convolution kernel. This kernel is then applied to the entire seismic volume. Based upon experience, the Conor filter works well unless there are regions in the seismic data where the geology has the same characteristics (orientation and frequency) as the specified noise direction. In these regions, the signal associated with the geology is mitigated, reducing interpretability of the seismic data. In addition, if multiple sets of coherent noise with different direction angles exist, multiple Conor filters must be applied in sequence which can lead to over-smoothing and introduction of unwanted artifacts. As a result, a filter such as the Conor filter can be applied only in a limited number of cases.

In Conor, coherent noise is removed by a 2D filter designed for this purpose. On an inline or crossline seismic slice, a 2D convolution kernel is applied at every pixel location in the underlying data to remove the noise. The kernel weights are the combination of the three matrices (see FIG. 2): identity matrix I—noise direction matrix nd+local average matrix avg.

Figure 3:
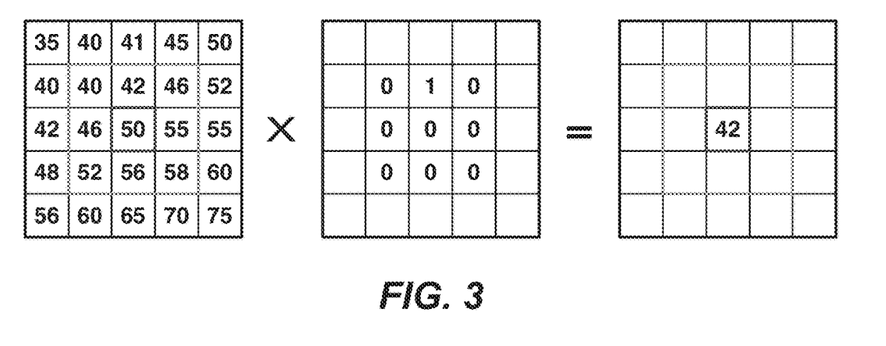
FIG. 3 shows a simple example of matrix convolution using a 3×3 kernel.

Convolution is a familiar operation to those who work in the field of seismic data processing. For a simple definition of convolution, the lay reader may refer to *Seismic Data Processing*, by O. Yilmaz, Society of Exploration Geophysicists, Tulsa, Okla., 17-21 (1987). As applied to matrices, convolution is the action upon a matrix, representing for example an image, by another matrix which is called the "kernel." The kernel acts as a filter that successively studies every pixel of the image, and for each pixel, multiplies the value of this pixel and (assuming a 3×3 kernel is selected) the values of the 8 surrounding pixels by the kernel's corresponding value. Then these nine resulting numbers are summed, and that number becomes the value of that particular pixel after the convolution operation. A sample example is shown in FIG. 3 where the image matrix is shown on the left, with each pixel displaying its value. The example illustrates the convolution operation on the pixel in the center of the image, which has a value of 50. The 3×3 kernel is shown in the middle of the drawing, and it operates on the 3×3 sub-matrix surrounding the center pixel in the image. In this simple example, all kernel weights are zero except one, which has a value of 1. On the right is the convolution result for the center pixel. Each pixel in the image is operated upon in the same way.

The convolution result of using the identity matrix (I) does not change the input. The noise direction (nd) matrix is constructed in a way that it contains zeros everywhere except those elements aligned with the direction of the coherent noise (symbolically represented as the stripe 21 in FIG. 2). Applying nd will extract the noise from the input data. Finally, the local average matrix avg captures the mean value of seismic amplitude in the local neighborhood. Since convolution is associative, the three matrices (I, nd, and avg) may be combined together as a single matrix, which is then applied to every pixel on the input seismic slice.

There are two parameters provided by the user of Conor: (1) kernel size, and (2) noise direction, and both of them are fixed. Selecting the kernel size (step 54 in the flow chart FIG. 5) is like selecting a window size within which to apply any processing of seismic data. The user picks the kernel size depending on the average size of geologic features in the image. If the kernel size is too large, the noises may not be removed sufficiently; if it is too small, some geological features might be misinterpreted to be noise by the algorithm and removed. For the noise direction, the user also picks the most prominent direction of the noise that can be visually observed in the input data. While this may be sufficient in simple cases, as mentioned above, many seismic datasets contain multiple sets of coherent noises in different regions of the data. With only one representative direction, some noises may not be removed sufficiently. Furthermore, since the geology varies throughout the seismic volume, one fixed "noise" direction is highly likely to be coincident with some true geologic features. As a result, features of interest could be removed unintentionally, while remnants of coherent noises still remain. A modification that mitigates this issue is to expand the noise direction line into a "fan", but this does not solve the problem entirely and may lead to degraded performance.

Coherent noise removal would be simpler if the noise direction were fixed. In reality, this is seldom the case. The design goal of the present invention, therefore, is to be able to automatically and adaptively estimate the noise direction in the data without user intervention. The problem here is that, in typical seismic data, or any other type of image data that one may want to enhance, the noise is usually much weaker than the signal. With this understanding, instead of trying to estimate noise, the present inventive method extracts the orientation of geology, i.e. the features that represent desirable signal, not unwanted noise. Using the previously-described principle of Conor, the geology is then "removed" from input data, yielding the noise component. Finally, the noise is subtracted from the input to generate the result.

Figure 5:
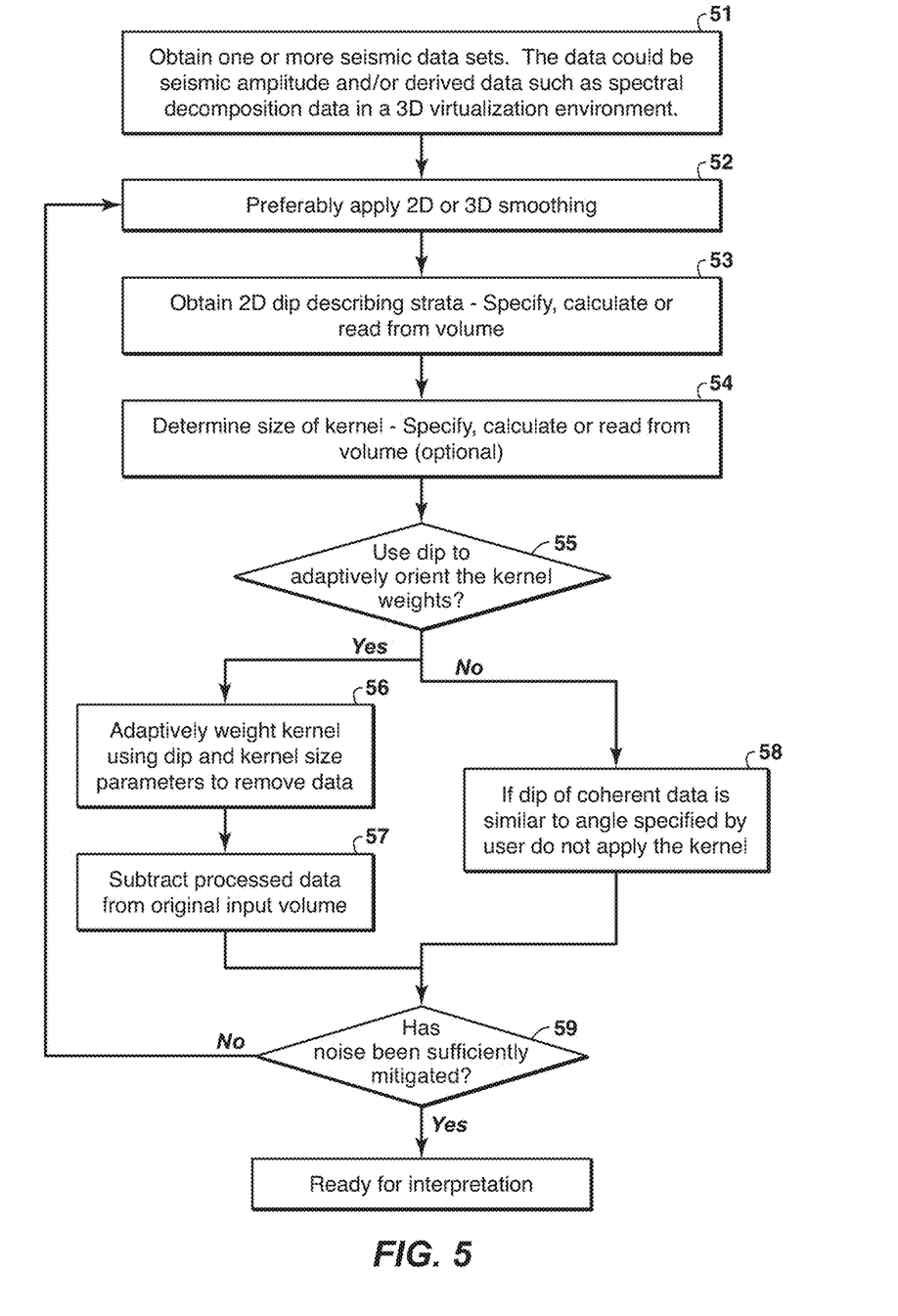
FIG. 5 is a flow chart showing basic steps in one embodiment of the present inventive method.

FIG. 5 is a flow chart showing basic steps in one embodiment of the present inventive method. After obtaining seismic data to be processed (step 51), and preferably applying smoothing to the data (step 52), the method may be divided into two important parts:
 (1) Geology orientation estimation using structure tensor analysis (Step 53 in FIG. 5), and
 (2) CONOR-like convolution for noise removal (Steps 54-59).

Next, each of the parts is looked at in more detail.

Structure Tensor Analysis

Structure tensor analysis is a common approach to estimate orientation in noise image data. See, for example:

J. Bigun and G. Granlund, "Optimal Orientation Detection of Linear Symmetry," Tech. Report LiTH-ISY-I-0828, Computer Vision Laboratory, Linkoping University, Sweden; Thesis Report, Linkoping studies in science and technology No. 85 (1986).

J. Bigun and G. Granlund, "Optimal Orientation Detection of Linear Symmetry," First Int. Conf. on Computer Vision, ICCV, (London). Piscataway: IEEE Computer Society Press, Piscataway, 433-438 (1987).

H. Knutsson, "Representing local structure using tensors," Proceedings 6th Scandinavian Conf. on Image Analysis, Oulu; Oulu University, 244-251 (1989).

In 3D, the structure tensor is a 3×3 matrix and has the following form:

$$\begin{bmatrix} GxGx & GxGy & GxGz \\ GxGy & GyGy & GyGz \\ GxGz & GzGy & GzGz \end{bmatrix}$$

where Gx, Gy, Gz) is the gradient vector. To account for the presence of noise, a spatial average scheme may be first applied, then the gradient vector may be computed yielding the structure tensor. Then the eigenvectors of the tensor matrix may be computed, which gives the 3D orientation of the structure. There is an analytical solution for 3×3 structural tensors; however it is not trivial because one needs to account for subtle numerical issues.

Figure 4:
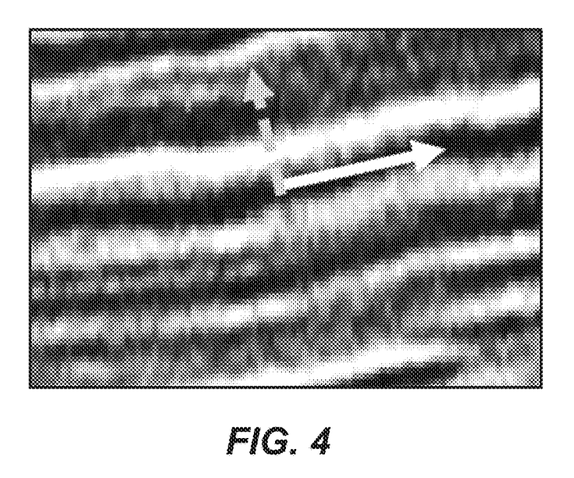
FIG. 4 illustrates how the strata orientation may be obtained from the dominant eigenvector using structural tensor analysis.

The result of the structural tensor analysis yields the dominant eigenvector, which is a 3D vector locally perpendicular to the strata (the gray dashed arrow in FIG. 4). Once the dominant eigenvector is obtained, it is then projected onto the seismic slice and rotated by 90 degrees to compute the apparent dip (the white arrow in FIG. 4). This represents an estimation of strata orientation (step 53).

Noise Removal

Figure 2:
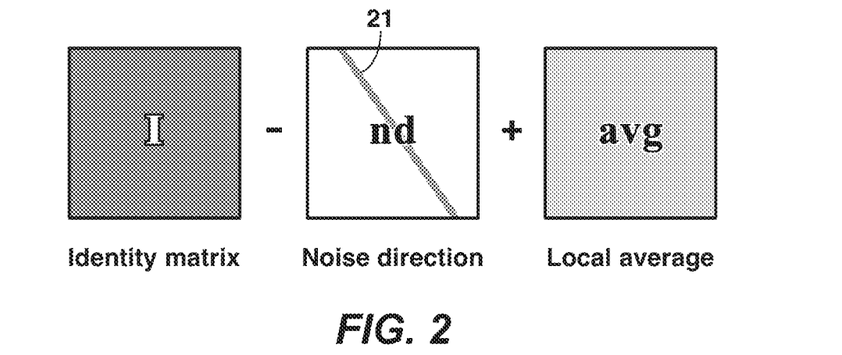
FIG. 2 is a schematic diagram illustrating kernel weights composition in Conor.

In this stage of the present inventive method, the "noise direction" matrix nd in FIG. 2 is replaced with the strata orientation extracted from the structural tensor analysis. This yields a convolution kernel removing the strata from the input data. Applying this convolution kernel to the input image leaves the noise plus the local average seismic amplitude. The local average amplitude (i.e., the average of all the data values within the kernel window) is then subtracted (step 56), leaving just the noise, which is then subtracted from original input (step 57) to yield the desired result.

In order to avoid constructing a unique convolution matrix at every pixel location, given a fixed kernel size (provided by the user—step 54), all possible convolution matrices may be pre-computed. This is done by discretizing the direction vector on a fixed kernel window. In a 3×3 kernel window, all possible (i.e. discretely representable) directions are shown in Table 1, where 1's represent the strata orientation. In the runtime, the actual orientation vector computed at each pixel may be used as an index to pick the convolution matrix constructed from a direction vector closest to it.

TABLE 1

| 0 | 1 | 0 | 1 | 0 | 0 | 0 | 0 | 0 | 0 | 0 | 1 |
|---|---|---|---|---|---|---|---|---|---|---|---|
| 0 | 1 | 0 | 0 | 1 | 0 | 1 | 1 | 1 | 0 | 1 | 0 |
| 0 | 1 | 0 | 0 | 0 | 1 | 0 | 0 | 0 | 1 | 0 | 0 |

Steps 55 and 58 provide an alternative embodiment of the invention. The structural tensor from step 53 may be checked (step 55), and if the structural tensor is similar to a user-specified noise direction, then (step 58) the Conor filter/kernel is not applied, i.e. steps 56 and 57 may be skipped. In other words, the user may elect to supply a predominant noise direction, just as in the original Conor method. In this case, step 55 may be inserted into the flow, where a test is made to determine if the noise direction is by chance aligned with the structure orientation for some data pixels. If it is, steps 56 and 57 will not help for those data pixels because the noise will not be distinguishable from the structure. Thus, inclusion of steps 55 and 58 in the present inventive method is optional.

The process may be iterated (step 59) for more noise removal. The invention is quite suitable for highly efficient implementation on a massively parallel computer architecture (GPU or cluster).

Better noise removing power may possibly be obtained by skewing the convolution window along with the orientation vector. Alternatively, seismic image data can be locally flattened to the extent of the convolution window.

Test Results

Figure 6A:
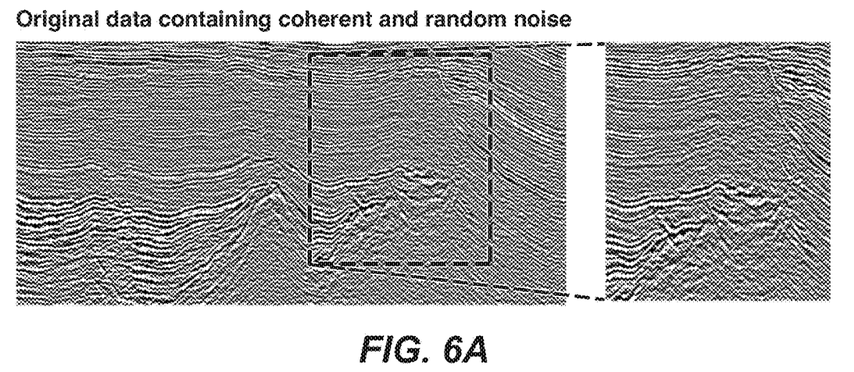
FIGS. 6A-6C show the results of a test application of the present inventive method, comparing the data before application to the data after noise removal.
Figure 6B:
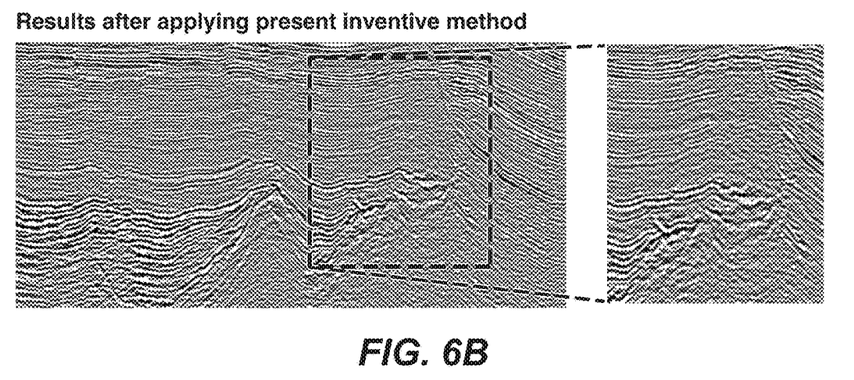
Figure 6C:
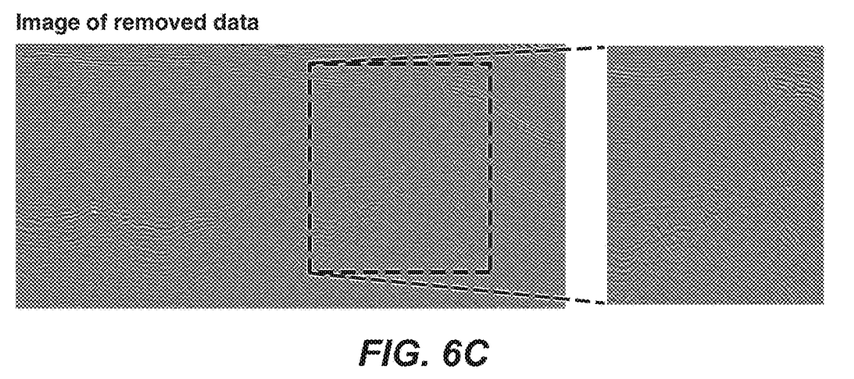

FIGS. 6A-6C show test results for the present inventive method. FIG. 6A shows seismic data containing coherent and random noise; FIG. 6B shows the data after noise removal by the present inventive method; and FIG. 6C shows an image of the data that were removed. The dashed-line rectangle indicates the selected window size for the signal-removal kernel. FIG. 6B shows that the final results after coherent noise removal are noticeably improved. It can be seen that terminations are preserved and that non-geological non-horizontal events are significantly reduced. FIG. 6C shows that while the invention has removed some of the geological structure along with the noise, the lost structure information is minimal compared to the amounts of noise removed.

Figure 7A:
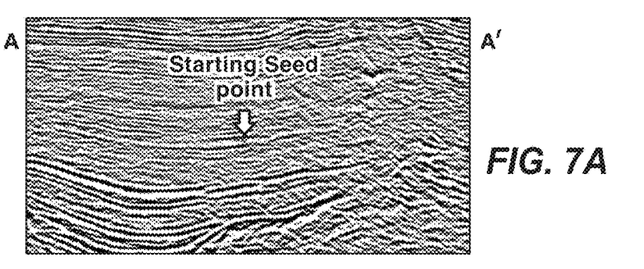
FIGS. 7A-7D demonstrate the beneficial impact of using the present inventive method for automated horizon interpretation.
Figure 7B:
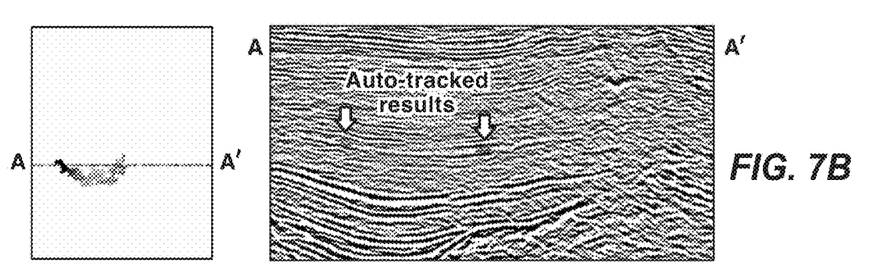
Figure 7C:
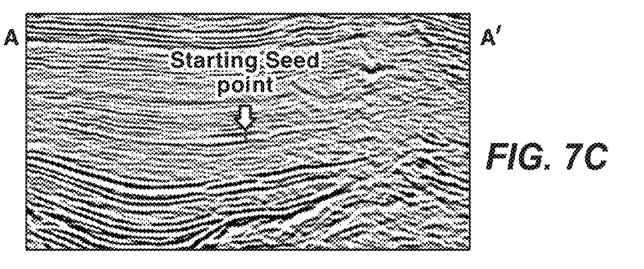
Figure 7D:
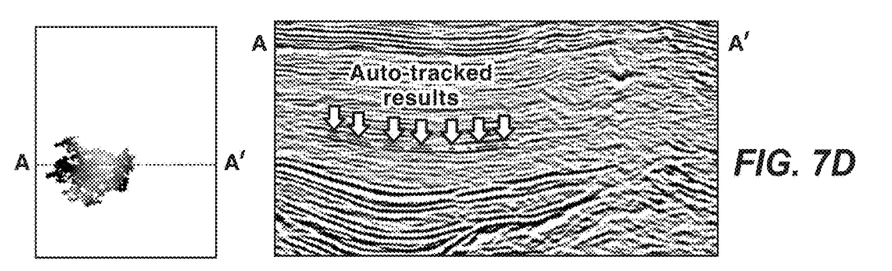

FIGS. 7A-7D illustrate the impact of using the present inventive method for automated horizon interpretation. FIG. 7A shows input seismic data with a starting seed point. FIG. 7B shows the results of applying a traditional horizon tracking algorithm to this one seed point. FIG. 7C shows the same input data after processing by the present inventive method to remove coherent noise, with a starting seed point. FIG. 7D shows the results of applying the traditional horizon tracking algorithm to the seed point in the data of FIG. 7C. On the left side of FIGS. 7B and 7D, map views of the horizons generated by the horizon tracking algorithm are shown for the noisy data (7B) and the processed data (7D). It can be seen that the resulting horizon from the processed data (FIG. 7D) covers a significantly larger area of the data volume. This demonstrates that using data processed by the present inventive method can accelerate interpretation and reduce the amount of user input required.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for mitigating coherent noise in seismic data, comprising:
   (a) obtaining seismic data;
   (b) identifying from the seismic data a dominant direction representing orientation of subsurface strata using structure tensor analysis, wherein a dominant eigenvalue of the structure tensor determines a strata orientation vector;
   (c) adaptively subtracting data corresponding to the dominant direction from the seismic data using a convolution matrix, wherein the adaptive subtraction is performed by filtering the seismic data with a convolution kernel, said convolution kernel having weights adaptively determined from estimates of structure dips in an image of the seismic data;
   (d) subtracting local average seismic amplitude from data resulting from (c), to generate an estimate of noise, wherein the local average seismic amplitude is an average of all data within a window of the convolution kernel; and
   (e) subtracting the estimated noise from the obtained seismic data;
wherein the steps (c), (d), and (e) are performed using a computer.

2. The method of claim 1, further comprising smoothing the obtained seismic data before (b).

3. The method of claim 1, further comprising additional noise mitigation by repeating (b)-(e) at least once.

4. The method of claim 1, further comprising selecting a size for a 2-D or 3-D window, and applying (b)-(e) to the seismic data one window at a time.

5. The method of claim 1, wherein the strata orientation vector is rotated by 90 degrees to compute apparent dip, which is used as a local estimate of the subsurface strata orientation direction.

6. The method of claim 1, wherein the convolution matrix is constructed for each pixel location in the data; or the subsurface strata direction is compared to an estimate of noise direction, and for pixel locations where aligned, the convolution matrix is not constructed.

7. The method of claim 1, wherein the data subtracted in (c) are identified by the strongest and most coherent pattern in the original seismic data.

8. The method of claim 1, further comprising applying an automated interpretation technique to the seismic data with the estimated noise subtracted therefrom.

* * * * *